United States Patent [19]

Balz et al.

[11] Patent Number: 4,629,632
[45] Date of Patent: Dec. 16, 1986

[54] PRODUCTION OF MAGNETIC RECORDING MEDIA

[75] Inventors: Werner Balz, Limburgerhof; Jenoe Kovacs, Hessheim; Hilmar Lechner, Frankenthal; Dieter Schaefer, Lindenberg; Ingolf Buethe, Boehl-Iggelheim, all of Fed. Rep. of Germany

[73] Assignee: BASF Aktiengesellschaft, Ludwigshafen, Fed. Rep. of Germany

[21] Appl. No.: 759,235

[22] Filed: Jul. 26, 1985

[30] Foreign Application Priority Data

Jul. 27, 1984 [DE] Fed. Rep. of Germany ....... 3427683

[51] Int. Cl.$^4$ ............................................... B05D 3/06
[52] U.S. Cl. ................................... 427/54.1; 427/130; 427/131

[58] Field of Search ................................. 427/127–132, 427/48, 54.1, 44

[56] References Cited

U.S. PATENT DOCUMENTS 3,215,554 11/1965 Loots et al. .
4,468,436 8/1984 Okita et al. .................... 427/131 X Primary Examiner—Bernard D. Pianalto
Attorney, Agent, or Firm—Keil & Weinkauf

[57] ABSTRACT

Layer-type magnetic recording media are produced by applying a dispersion of a magnetically anisotropic material in a binder solution onto a flexible plastic base provided with an adhesion-promoting layer and then solidifying the magnetic layer, by a method in which the adhesion-promoting layer consists of a radiation-curable aqueous dispersion of a polymer.

7 Claims, No Drawings

PRODUCTION OF MAGNETIC RECORDING MEDIA

The present invention relates to a process for the production of layer-type magnetic recording media by applying a dispersion of magnetically anisotropic material in a binder solution onto a flexible plastic base provided with an adhesion-promoting layer and then solidifying the magnetic layer, wherein the adhesion-promoting layer consists a radiation-curable aqueous dispersion of a polymer.

The use of an adhesion-promoting layer between the flexible plastic base and the magnetic layer has long been known. For example, German Published Application DOS No. 1,282,698 describes an adhesion-promoting layer which consists of a vinylidene chloride/acrylonitrile copolymer containing from 81 to 98% of vinylidene chloride groups. These and other similar adhesion-promoting intermediate layers are applied onto the base as a solution in an organic solvent and solidified by evaporating the solvent.

The production of an adhesion-promoting intermediate layer by means of an aqueous emulsion is disclosed in French Pat. No. 1,396,490, a terpolymer of from 35 to 94% of vinylidene chloride, from 3.5 to 40% of an acrylate or acrylonitrile and from 0 to 25% of itaconic or acrylic acid being employed. Japanese Published Application No. 72 28649 describes a different procedure in which mixtures of monomeric alkyl compounds and prepolymers are applied from organic solutions, and the layer is dried, and cured by radiation polymerization. However, the disadvantage of the above processes is that they give adhesion-promoting layers which are not sufficiently solvent-resistant. Because the magnetic layer is required to possess uniform mechanical properties, a lack of adequate solvent resistance is troublesome particularly in the case of the adhesion-promoting intermediate layers which are intended to fix the magnetic layer on the base film and are usually extremely thin. Moreover, in most of the processes for the production of these intermediate layers, the large amounts of organic solvents used for producing the thin layers present problems.

It is an object of the present invention to provide a process for the production of layer-type magnetic recording media which makes it possible to overcome the above disadvantages and in particular to produce an adhesion-promoting intermediate layer which has the required thinness coupled with high uniformity, is mechanically stable and completely insoluble in organic solvents and substantially improves the adhesion of the magnetic layer to the base.

We have found that this object is achieved, and that layer-type magnetic recording media which meet the requirements set can be produced by applying a dispersion or magnetically anisotropic material in a binder solution onto a flexible plastic base provided with an adhesion-promoting intermediate layer and then solidifying the magnetic layer, if the adhesion-promoting intermediate layer is obtained by applying a radiation-curable aqueous dispersion of a polymer onto the flexible plastic base, drying the layer and then crosslinking it with UV light.

Suitable radiation-curable aqueous dispersions of polymers are prepolymers which are dispersed in water, contain from 0.01 to 1.0 mole of polymerizable C—C double bonds per 100 g of prepolymer, and have a mean molecular weight of not less than 350 and a viscosity of not less than 600 cP at 23° C.

Preferred compounds are polymerizable polyesters which contain C—C double bonds and have an acid number of not more than 10, polymerizable polyethers containing C—C double bonds, hydroxyl-containing reaction products of a polyepoxide containing not less than two epoxide groups per molecule with one or more $\alpha,\beta$-ethylenically unsaturated carboxylic acids, polyurethane (meth)acrylates, and acrylic copolymers containing $\alpha,\beta$-ethylenically unsaturated acyl radicals.

The preparation of these radiation-curable aqueous binder dispersions is known per se (German Laid-Open Application DOS No. 2,853,921). In the procedure described there, organic solutions of the above prepolymers are mixed with aqueous solutions of polyvinyl alcohols having a residual acetate content of less than 35 mol % and/or a vinylpyrrolidone/vinyl ester copolymer having a vinyl ester content of less than 35% by weight, and the inert organic solvent or solvent mixture is removed by distillation.

Examples of suitable prepolymers are

1. A polyester having an acid number of not more than 10 and obtained from aliphatic and/or aromatic dicarboxylic acids, such as succinic acid, glutaric acid, adipic acid, pimelic acid, suberic acid, azelaic acid, sebacic acid, cyclohexanedicarboxylic acid, phthalic acid, isophthalic acid, terephthalic acid, maleic acid, fumaric acid, itaconic acid or their derivatives, and polyhydric alcohols, such as ethylene glycol, polyethylene glycols, propylene glycol, polypropylene glycols, butanediol, hexanediol, neopentylglycol, neopentylglycol hydroxypivalate, trimethylolpropane, glycerol, pentaerythritol and/or trishydroxyethyl isocyanurate, as well as $\alpha,\beta$-ethylenically unsaturated monocarboxylic acids, for example acrylic acid, methacrylic acid, crotonic acid or cinnamic acid, and/or half esters of dicarboxylic acids with monoalkanols, such as half esters of maleic, fumaric or itaconic acid with $C_1$-$C_4$-monoalcohols, acrylic acid and methacrylic acid being preferred, which can be prepared by a conventional process, in one step or stepwise, 2. an aliphatic or araliphatic polyether which is obtained by reacting dihydric and/or polyhydric alcohols, which are also mentioned under 1., with various amounts of ethylene oxide and/or propylene oxide, and some or all of whose free hydroxyl groups are etherified with ethylenically unsaturated alcohols, e.g. allyl alcohol, methyallyl alcohol, crotyl alcohol or cinnamyl alcohol, and/or esterified with $\alpha,\beta$-ethylenically unsaturated monocarboxylic acids, as mentioned under 1., 3. an unsaturated hydroxyl-containing compound which can be prepared by reacting a polyepoxide having on average not less than two epoxide groups per molecule, for example polyglycidyl ethers of polyhydric alcohols, as also mentioned under 1., polyglycidyl ethers of polyhydric phenols, such as bisphenol A, glycidyl esters of polybasic carboxylic acids, as also mentioned under 1., other glycidyl compounds, e.g. triglycidyl isocyanurate, and/or epoxidized natural or synthetic oils, with $\alpha,\beta$-ethylenically unsaturated carboxylic acids as also mentioned under 1., 4. a polyurethane which may or may not contain urea groups and can be prepared from aliphatic and/or aromatic polyisocyanates, e.g. tetramethylene diisocyanate, hexamethylene diisocyanate, isophorone diisocyanate, diphenylmethane diisocyanate, toluylene diisocyanate, naphthylene diisocyanate or 4,4'-diphenyl ether diisocyanate, any dimers or trimers derived from these, and their reaction products with minor amounts of compounds possessing active hydrogen, for example polyhydric alcohols, which are also mentioned under 1., polyfunctional amines and/or amino alcohols, by reaction with hydroxyl-containing (meth)acrylates, such as hydroxypropyl (meth)acrylate and/or butanediol mono(meth)acrylate, and 5. a polymer which can be obtained by introducing $\alpha,\beta$-ethylenically unsaturated acyl radicals, which are derived from, for example, the $\alpha,\beta$-ethylenically unsaturated monocarboxylic acids mentioned under 1., into acrylate copolymers, styrene/acrylate copolymers or the like which are prepared by a conventional solution polymerization method, having a content of not less than 0.02 mole of hydroxyl, carboxyl and/or epoxide groups per 100 g of substance.

Mixtures of tne prepolymers stated under 1. to 5. are also suitable.

From 1 to 10, preferably from 2 to 5, % by weight of polymeric leveling agents are added to the aqueous dispersions used for the preparation of the adhesion-promoting intermediate layer. These are preferably water-soluble high molecular weight organic compounds containing polar groups, e.g. polyvinylpyrrolidone, copolymers of vinyl propionate or acetate and vinylpyrrolidone, partially hydrolyzed copolymers of acrylates and acrylonitrile, polyvinyl alcohols having various residual acetate contents, cellulose ethers, gelatin or mixtures of these substances. Particularly preferred protective colloids are polyvinyl alcohol having a residual acetate content of less than 35, in particular from 5 to 30 mol % and/or a vinylpyrrolidone/vinyl propionate copolymer having a vinyl ester content of less than 35, in particular from 5 to 30, % by weight.

It is furthermore possible to use nonionic emulsifiers, and in special cases even ionic ones. Preferred emulsifiers are relatively long-chain alcohols or phenols of various degrees of oxyethylation and/or oxypropylation (adducts containing from 4 to 50 moles of ethylene oxide and/or propylene oxide). Combinations of the above protective colloids with emulsifiers of this type are particularly advantageous since they give more finely divided dispersions.

The radiation-curable dispersions furthermore contain conventional photoinitiators which are soluble or dispersible in water and initiate polymerization under the action of light of short wavelength, in particular ultraviolet light. Suitable photoinitiators are in general benzoin and its derivatives, such as benzoin methyl ether or benzoin ethyl ether, ketones, such as acetophenone, benzophenone or Mischler's ketone, and diketones, such as benzil. Dimethylhydroxyacetophenone has proven particularly useful. The photoinitiators are used in an amount of 0.1 to 20, preferably from 0.5 to 10, % by weight, based on the photopolymerizable adhesion promoter. In order to accelerate the polymerization, accelerators are also used, these predominantly being tertiary amines, e.g. triethalamines and the like.

Advantageously used sources of light for initiating the polymerization are those which emit light having a wavelength of from 2,000 to 8,000 Å and produce a sufficient proportion of light within this wavelength range, for example low pressure or high pressure mercury lamps. High pressure mercury lamps have proven the most suitable for carrying out the procedure in the presence of air.

The aqueous dispersions intended for producing the adhesion-promoting intermediate layer are applied in the apparatuses conventionally employed for magnetic coating. The application procedure can be carried out using the conventional gravure rollers or knife coaters, and a concentration of the dispersion can vary from 5 to 30%, preferably from 10 to 20%. This gives adhesion-promoting layers about 0.2-5 μm, preferably 0.5-1 μm, thick.

When the adhesion-promoting intermediate layer has been applied onto the conventional base, in particular a film of a linear polyester, such as polyethylene terephthalate, and has been cured, the production of the magnetic recording medium is continued in a conventional manner.

The composition and preparation of the dispersion of the magnetic materials in the dissolved or dispersed polymer binder correspond to the conventional processes.

Suitable binders for the dispersion of the finely divided magnetic material are those conventionally used for the production of magnetic layers, for example a nylon copolymer which is soluble in conventional solvents, a polyvinylformal, a polyurethane elastomer, mixtures of polyisocyanates and fairly high molecular weight polyhydroxy compounds or vinyl chloride polymers containing more than 60% of vinyl chloride building blocks, e.g. a vinyl chloride copolymer containing one or more comonomers, such as a vinyl ester of a monocarboxylic acid of 2 to 9 carbon atoms, or an ester of an aliphatic alcohol of 1 to 9 carbon atoms with an ethylenically unsaturated carboxylic acid of 3 to 5 carbon atoms, e.g. the esters of acrylic acid, methacrylic acid or maleic acid, or a copolymer of vinyl chloride with one or more of these carboxylic acids themselves as comonomers, or hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl or 2-hydroxyethyl (meth)acrylate.

Any crosslinking of the magnetic recording layer which may be required, depending on the binder system and tape properties, can be effected by reacting the polyurethanes or polyurethane binder mixtures with polyisocyanates. A large number of organic di-, tri- or polyisocyanates or isocyanate prepolymers having a molecular weight of 10,000, preferably from 500 to 3,000, can be used for the crosslinking. Preferred polyisocyanates are those which carry more than 2 NCO groups per molecule. Polyisocyanates which are based on toluylene diisocyanate, hexamethylene diisocyanate or isophorone diisocyanate and are produced by polyaddition with diols or triols or by biuret and isocyanurate formation have proven particularly useful. An adduct of toluylene diisocyanate with trimethylolpropane and diethylene glycol is particularly advantageous. The amount of polyisocyanate can vary greatly depending on the binder system.

Water, cyclic ethers, such as tetrahydrofuran or dioxane, and cyclic ketones, such as cyclohexanone, are used as solvents, depending on the type of binder. If polyurethanes are used, they may of course also be dissolved in other highly polar solvents, such as dimethylformamide, N-methylpyrrolidone, dimethyl sulfoxide or ethylene glycol acetate. It is also possible to mix the stated solvents with aromatics, such as toluene or xylene, and esters, such as ethyl or butyl acetate.

Preferred magnetic materials are finely divided acicular gamma-iron(III) oxide having a mean particle size of from 0.1 to 2 μm, in particular from 0.1 to 0.9 μm, or acicular chromium dioxide having the same particle structure as that stated for the iron oxide. Other suitable materials are gamma-iron(III) oxide doped with heavy metals, in particular with cobalt, and finely divided metal alloys of iron, cobalt and/or nickel.

Other additives for improving the magnetic layer may be added to the dispersions, for example fatty acids, polycarboxylic acids, mono-, di- or polysulfonic acids or phosphoric acids, mixtures of these, esters or salts with metals of groups 1 to 4 of the Periodic Table, waxes, lecithins, silicone oils and fluorocarbons, and fillers such as carbon black, graphite, quartz flour and/or non-magnetizable powders based on silicates. In general, the total amount of such additives is less than 10% by weight, based on the magnetic layer.

The magnetic layer is produced in a conventional manner, the magnetic material being dispersed with the binder used and sufficient solvent in a dispersing machine, e.g. a tubular ball mill or a stirred ball mill, with the addition of dispersants and, if required, further additives. The advantageous binder/pigment ratio can be established by adding these to the mixture either in solid form or in the form of from 10 to 60% strength solutions or from 30 to 60% strength dispersions. It has proven advantageous to continue dispersing until an extremely fine distribution of the magnetic material is achieved, which may take from 1 to 5 days. Subsequent repeated filtering gives a completely homogeneous magnetic dispersion. Any crosslinking agents required are added to the dispersion before the coating procedure.

The magnetic dispersion is then applied onto the non-magnetizable base with the aid of a conventional coating apparatus, for example a knife coater. Suitable non-magnetic and non-magnetizable bases are the conventional bases, in particular films of linear polyesters, such as polyethylene terephthalate, which are in general from 4 to 200 μm, in particular from 6 to 75 μm, thick. Before the still liquid coating mixture is dried on the base, which is advantageously effected at from 50° to 90° C. in the course of from 2 to 5 minutes, the anisotropic magnetic particles are oriented along the intended recording direction by the action of a magnetic field. The magnetic layer can then be calendered and compacted on conventional apparatuses by passing it between heated and polished rollers, if necessary under pressure, at from 50° to 100° C., preferably from 60° to 80° C. The thickness of the magnetic layer is in general from 3 to 20 μm, preferably from 4 to 15 μm.

The magnetic recording media produced according to the invention and possessing the advantageous adhesion-promoting intermediate layer exhibit substantially improved adhesion of the magnetic layer to the base compared with the prior art magnetic recording media. The radiation-crosslinked adhesion-promoting layers eliminate the disadvantageous sensitivity to solvents, which was usual in the past. The intermediate layers are moreover mechanically very stable, in particular scratch-resistant. The novel process also results in a substantial improvement in the homogeneity of the magnetic layer, due in particular to the presence of fewer coating defects, and in the mechanical properties of the layer, especially the durability and the stability under high temperature and humidity conditions.

The Examples which follow illustrate the process according to the invention, and its advantages are demonstrated by comparative experiments.

EXAMPLE 1

400 parts of an aqueous 40% strength polyacrylate dispersion which was based on phthalic acid, adipic acid, glycol, trimethylolpropane and acrylic acid and had an OH number of 320 and in which 85% of the OH groups had been reacted with acrylic acid was diluted with 2,800 parts of water, while stirring. Thereafter, 9.6 parts of a mixture of an oxyethylated phosphate and an alkylamide of sulfosuccinic acid, 16 parts of a 30% strength vinylpyrrolidone/vinyl propionate solution, 9.6 parts of triethanolamine and 9.6 parts of dimethylhydroxyacetophenone were added, a high-speed stirrer being used. After 10 minutes, the dispersion was filtered and applied onto a 15 μm thick polyethylene terephthalate film using a gravure roller. The water was then evaporated by means of a stream of hot air at 65° C., and the dry layer was crosslinked by means of a UV lamp (2.4 kW). The thickness of the adhesion-promoting layer was 0.5 μm.

The dispersion for the magnetic layer was then applied. To do this, 640 parts of a 2.5% strength solution of a thermoplastic polyester urethane, obtained from adipic acid, butane-1,4-diol and 4,4'-diisocyanatodiphenylmethane, in a mixture of equal amounts of tetrahydrofuran and dioxane, and 100 parts of a 20% solution of a phenoxy resin obtained from bisphenol A and epichlorohydrin, in the same solvent mixture, were dispersed for 4 days with 900 parts of a cobalt-modified gamma-iron(III) oxide having a coercive force of 54 kA/m, 22.5 parts of sodium oleate and a further 600 parts of the stated solvent mixture in a ball mill having a capacity of 6,000 parts by volume and charged with 8,000 parts by weight of steel balls having a diameter of from 4 to 6 mm. A further 640 parts of the stated polyester urethane solution and 100 parts of the phenoxy resin solution, 18 parts of butyl stearate, 4.5 parts of streaic acid and 400 parts of the stated solvent mixture were then added, and dispersing was continued for 24 hours. The resulting dispersion was filtered under pressure through a filter having 5 μm pores and was applied, by means of a conventional knife coater, onto the polyethylene terephthalate film provided with the adhesion-promoting layer. The coated film was passed through a magnetic field to orient the magnetic particles and then dried at from 60° to 80° C. After drying, the magnetic layer of the coated film was calendered and compacted by being passed twice between heated rollers at 90° C. and under a nip pressure of 35 kg/cm. The thickness of the magnetic layer was 4 μm. The adhesion-promoting effect was determined by measuring the separating force and the peeling resistance according to U. Zoll, Adhesion 1979, No. 5, pages 128–134. The results of the measurements are shown in the Table.

COMPARATIVE EXPERIMENT A

The dispersion for the magnetic layer described in Example 1 was applied directly onto the polyethylene terephthalate film by the method described there. The separating force and peeling resistance measured are shown in the Table.

COMPARATIVE EXPERIMENT B

A 5% strength solution of a vinylidene chloride/acrylonitrile polymer in tetrahydrofuran was applied onto the polyethylene terephthalate film by means of a gravure roller, as described in Example 1, and the layer was dried by heating. A dispersion for a magnetic layer was then applied on top of this, as described in Example 1. The results of the measurements are shown in the Table.

EXAMPLE 2

The procedure described in Example 1 was followed, except that the magnetic-layered dispersion below was applied.

50 parts of a chromium dioxide having an Hc value of 48 kA/m, 1.25 parts of zinc oleate, 71.1 parts of a 12.5% strength polyurethane solution in a 1:1 tetrahydrofuran/dioxane mixture, 11 parts of a 20% strength phenoxy resin solution, 1.0 part of butyl stearate, 0.25 part of stearic acid and 58.85 parts of the 1:1 tetrahydrofuran/dioxane solvent mixture were weighed into a glass bottle having a capacity of 0.25 l and containing 0.43 kg of steel balls (diameter 4-6 mm). The glass flask was then clamped in a vibratory ball mill and vibrated for 3 hours. Thereafter, the dispersion was separated from the balls by filtration and was processed further as described in Example 1. The results of the measurements are shown in the Table.

COMPARATIVE EXPERIMENTS C AND D

The experiments described under Comparative Experiments A and B were carried out using the dispersion for the magnetic layer described in Example 2. The results of the measurements are shown in the Table.

TABLE

|  | Separating force [N] | Peeling Resistance [N/cm] |
|---|---|---|
| Example 1 | 3.05 | 1.75 |
| Comparative Experiment A | 0.29 | 0.17 |
| Comparative Experiment B | 0.60 | 0.42 |
| Example 2 | 5.2 | 2.0 |
| Comparative Experiment C | 0.34 | 0.15 |
| Comparative Experiment D | 0.65 | 0.45 |

We claim:

1. A process for the production of a layer-type magnetic recording medium by applying a dispersion of a magnetically anisotropic material in a binder solution onto a flexible plastic base provided with an adhesion-promoting intermediate layer and then solidifying the magnetic layer, wherein the adhesion-promoting intermediate layer is obtained by applying a radiation-curable aqueous dispersion essentially consisting of
   (A) from 20 to 80% by weight of water and
   (B) from 80 to 20% by weight of one or more prepolymers which are dispersed in (A), contain from 0.01 to 1.0 mole of polymerizable C—C double bonds per 100 g of prepolymer and have a mean molecular weight of not less than 350 and a viscosity of 600 cP at 23° C.,
with the proviso that the sum of the percentages stated under (A) and (B) is 100, and furthermore
   (C) from 0.1 to 10% by weight, based on (B), of a polyvinyl alcohol having a residual acetate content of less than 35 mol % and/or a vinyl-pyrrolidone/vinyl ester compolymer having a vinyl ester content of less than 35% by weight and
   (D) from 0.5 to 10% by weight, based on the sum of (A) and (B), of one or more photoinitiators
onto the flexible plastic base, drying the layer and then crosslinking it with UV light before the dispersion of the magnetic material is applied to the intermediate layer.

2. The process of claim 1, wherein the component (B) is a polyester which contains polymerizable C—C double bonds and has an acid number of not more than 10.

3. The process of claim 1, wherein the component (B) is a polyether which contains polymerizable C—C double bonds.

4. The process of claim 1, wherein the component (B) is a hydroxyl-containing reaction product of a polyepoxide containing two or more epoxide groups per molecule with one or more $\alpha,\beta$-ethylenically unsaturated carboxylic acids.

5. The process of claim 1, wherein the component (B) is a polyurethane (meth)acrylate which may or may not contain urea groups.

6. The process of claim 1, wherein the component (B) is a polymer which contains polymerizable double bonds and is obtained by introducing $\alpha,\beta$-ethylenically unsaturated acyl radicals into acrylate copolymers.

7. The process of claim 1, wherein the component (B) is a thermoplastic polyurethane elastomer possessing terminal (meth)acrylate double bonds or (meth)acrylate double bonds in side chains and having a molecular weight of from 1,000 to 70,000.

* * * * *